United States Patent [19]

Hughes

[11] 4,321,702
[45] Mar. 23, 1982

[54] CARRIAGE RESET APPARATUS FOR DISC RECORD PLAYER

[75] Inventor: Larry M. Hughes, Indianapolis, Ind.

[73] Assignee: RCA Corporation, New York, N.Y.

[21] Appl. No.: 129,774

[22] Filed: Mar. 12, 1980

[51] Int. Cl.³ .................... G11B 17/04; G11B 21/12
[52] U.S. Cl. .................................. 369/77; 369/219; 369/225
[58] Field of Search ................ 369/77, 219, 225; 360/133, 97

[56] References Cited

U.S. PATENT DOCUMENTS 2,712,942 7/1955 Smits ............................. 369/77

FOREIGN PATENT DOCUMENTS 683058 11/1952 United Kingdom .
1534059 11/1978 United Kingdom .
2015237 9/1979 United Kingdom .

*Primary Examiner*—John W. Shepperd
*Attorney, Agent, or Firm*—E. M. Whitacre; J. S. Tripoli; D. A. Kulkarni

[57] ABSTRACT

A record cover engages a carriage-mounted pushback member to effect translation of the carriage toward the carriage starting position during insertion of a cover into the player when the pushback member is latched. When the carriage arrives at the desired position, the pushback member is unlatched to allow it to rotate out of the jacket insertion path as the jacket is further inserted into the player.

8 Claims, 7 Drawing Figures

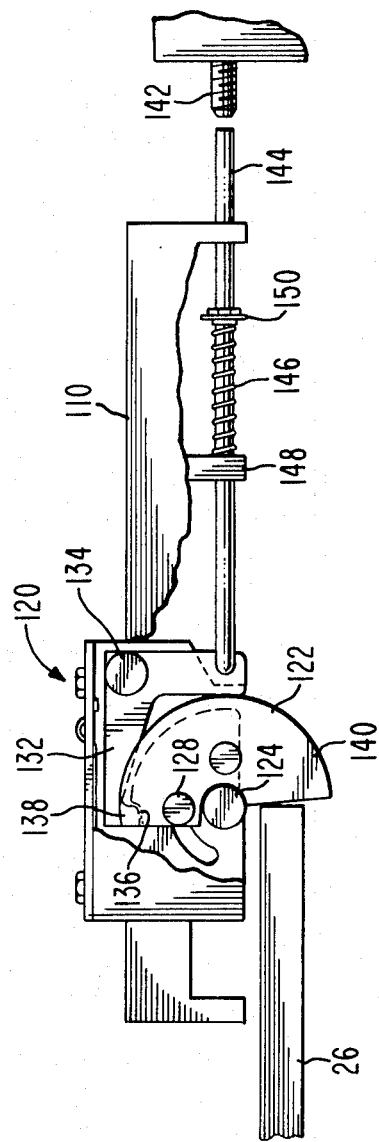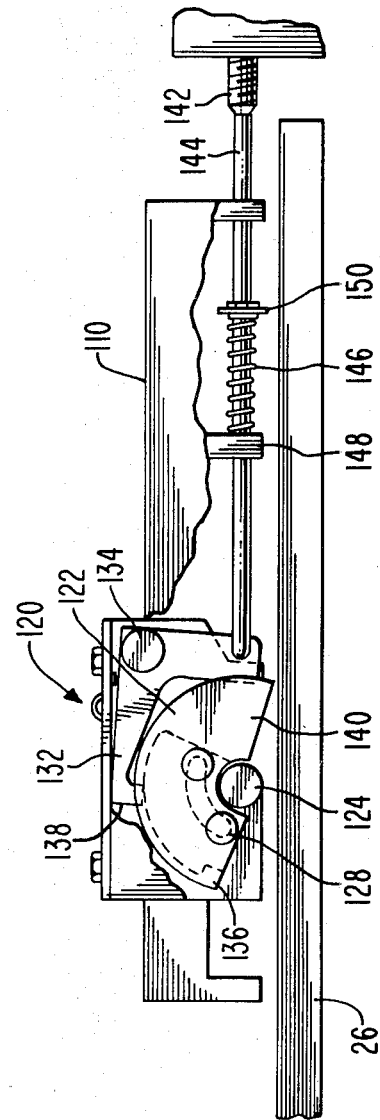

CARRIAGE RESET APPARATUS FOR DISC RECORD PLAYER

This invention relates to disc record players, and more particularly, to a system for automatically returning the pickup carriage to a starting position in a video disc player.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type video disc system is illustratively disclosed in U.S. Pat. No. 3,842,194 (Clemens).

To protect the video disc, it is beneficial to enclose it in a caddy which comprises an outer jacket and a record retaining spine. For record loading, a full caddy is inserted into an input slot provided in the player. A record extraction mechanism disposed in the player removes the record/spine assembly from the jacket during subsequent jacket withdrawal. The retained record is transferred to a turntable for playback. For record retrieval, an empty jacket is inserted into the player, whereby the record/spine assembly is returned back into the caddy. Withdrawal of the caddy from the player effects record retrieval. Reference is made to U.S. patent application, Ser. No. 964,531, filed in the name of Torrington, now U.S. Pat. No. 4,196,906, for an example of a caddy extraction mechanism.

In some video disc systems, a pickup cartridge is used to protect the pickup stylus from handling damage. The stylus arm supports the pickup stylus at one end thereof and has its other end secured to the pickup cartridge by means of a compliant coupler. The cartridge is, in turn, received in a carriage with a bottom opening through which the stylus protrudes for record engagement. During playback, the carriage is driven in a radial direction over the record in synchronism with the radial motion of the stylus. U.S. Pat. No. 4,053,161 (Bleazey, et al) describes an illustrative stylus lifting/lowering apparatus for effecting selective record engagement.

In the arrangement described in the above-mentioned Torrington application, the carriage is translated during playback toward the record center along a path disposed substantially parallel to the path of caddy travel and in a direction opposite to the direction of caddy insertion. The jacket engages the carriage to push it back to the carriage starting position when the jacket is inserted into the player for record retrieval.

In systems of the type mentioned above, the carriage must be precisely reset at the starting position at the beginning of each playback sequence so that the stylus is lowered within a relatively narrow landing zone disposed on the video disc. Because of the high groove density (e.g., 10,000 grooves per inch), the stylus landing zone on the disc record is extremely narrow (e.g., 0.008 to 0.010 inches). Since the amount of penetration of the jacket into the player varies, it is difficult to accurately reset the carriage within the precision tolerance limits simply by inserting the jacket into the player.

The carriage reset apparatus in accordance with this invention comprises a first member mounted on the carriage and subject to disposition in an operative position. The jacket engages the first member, when the first member is disposed in the operative position and when the carriage is at a position other than at the starting position, to effect translation of the carriage toward the starting position during jacket insertion. A carriage-mounted second member unlatches the first member in response to engagement with a player-mounted stop element upon arrival of the carriage at its starting position. When the first member is unlatched, it is displaced out of the jacket insertion path as the jacket is further inserted into the player. Pursuant to a further feature of the invention, the position of the stop element is subject to adjustment to allow variation in the location of the starting position of the carriage.

Figure 1:
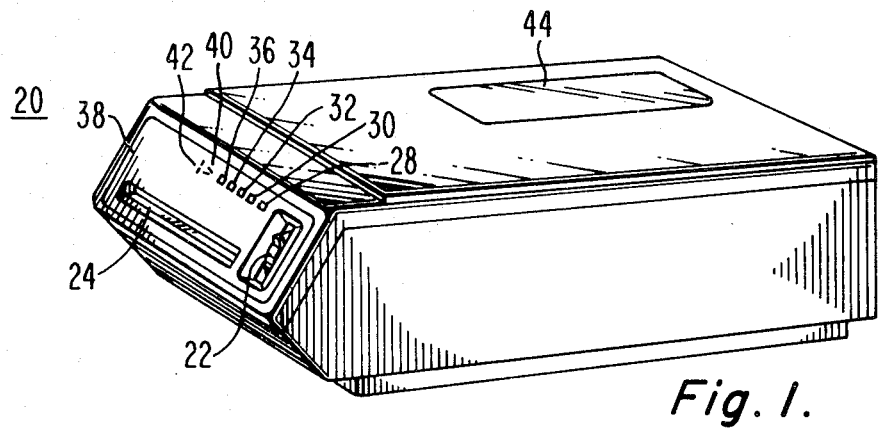
FIG. 1 shows the video disc player incorporating the carriage reset apparatus in accordance with the present invention.
Figure 3:
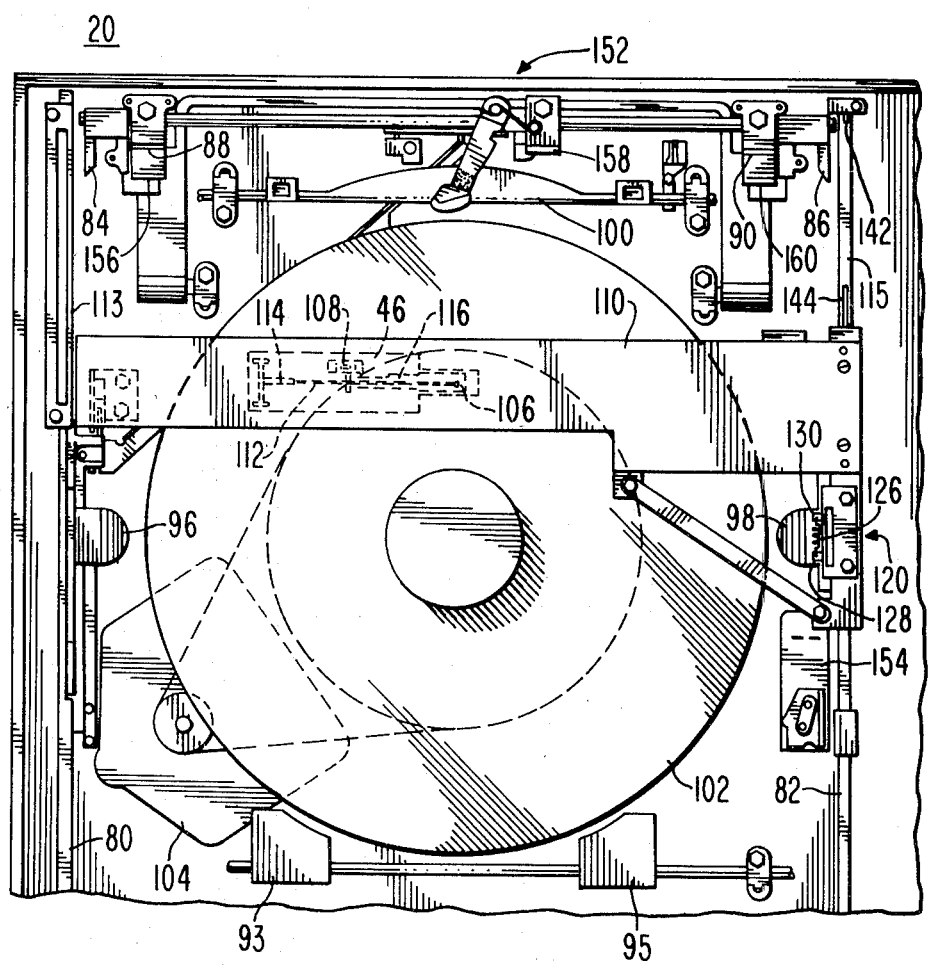
Figure 6:
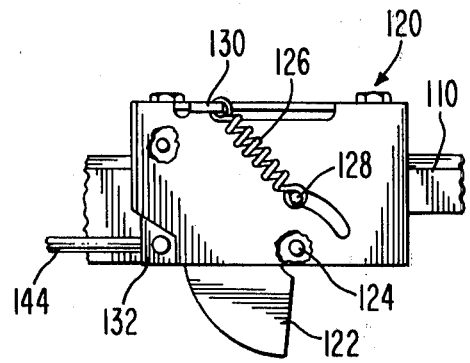
Figure 7:
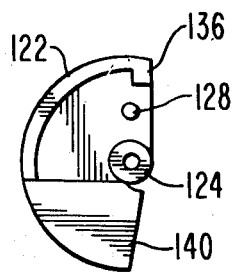

FIG. 3 provides a plan view of the video disc player of FIG. 1 showing the instant carriage reset apparatus;

FIGS. 4 and 5 illustrate the operating sequence of the subject carriage reset apparatus; and FIGS. 6 and 7 show certain details of the carriage reset apparatus of FIGS. 3-5.

Shown in FIG. 1 is a video disc player 20 having the subject carriage reset apparatus. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., fast forward/reverse and scan forward/reverse. A digital readout 40 provides an indication of playing time and other functions, such as, PAUSE, LOAD/UNLOAD and END-OF-PLAY, etc. A pair of tally lights 42 are operated to provide an indication of the record side subject to play, e.g., "SIDE 1" and "SIDE 2". An access door 44 is disposed on the cover of the player to provide access to a stylus cartridge 46 (FIG. 3).

Figure 2:
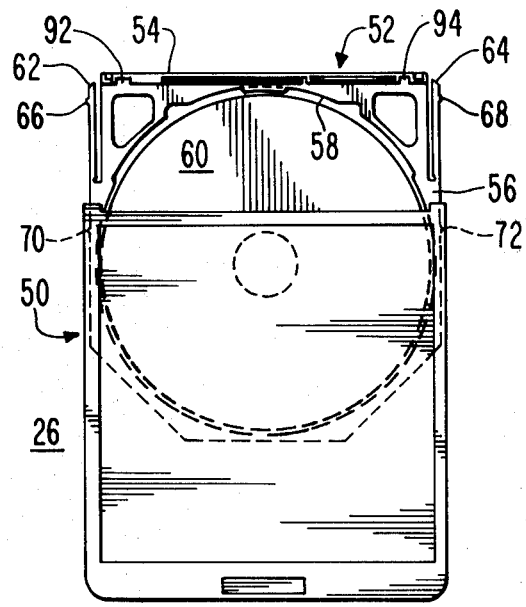
FIG. 2 illustrates a video disc caddy suitable for use with the carriage reset apparatus of FIG. 1 in practice of the subject invention.

As shown in FIG. 2, the video disc caddy 26, suitable for use with the present carriage reset apparatus, comprises a jacket 50 having an edge opening and a substantially planar, record retaining spine 52. The record retaining spine 52 has a portion 54 which serves as a closure when the spine is fully inserted into the jacket, and a further portion 56 having a circular opening 58 for receiving a record 60. The spine 52 is further provided with a pair of integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein.

The operation of the caddy extraction mechanism will be first explained in conjunction with FIG. 3. To load a record into the player, a caddy is inserted into the player along a path defined by guideways 80 and 82. As the caddy arrives at a fully inserted position in the player, a pair of latch defeat members 84 and 86 enter the jacket 50 to defeat the spine latch fingers 62 and 64 for freeing the spine 52 from the jacket. Pivotally mounted in the player are a pair of spine gripper members 88 and 90 which are received in a pair of cutouts 92 and 94, arranged in the spine 52, when the caddy arrives at the fully inserted position in the player in order to lock the spine to the player. Since the spine 52 is released from the jacket 50 through the operation of the latch defeat members 84 and 86 and latched to the player through the operation of the spine gripper members 88 and 90, subsequent withdrawal of the jacket leaves the record/spine assembly in the player. The spring-loaded receiver pads 93, 95, 96, 98 and 100 serve to accurately locate the retained spine/record assembly in the player. A pair of springs (not shown) disposed between a gripper arm 91, carrying the spine gripper members 88 and 90, and the latch defeat members 84 and 86 effect downward deflection of the latch defeat members during jacket withdrawal.

To transfer the retained record to a turntable 102, the function lever 22 is moved to the PLAY position, which, in turn, raises the turntable and starts a turntable motor 104. The retained record is picked up as the turntable 102 is raised, leaving the spine 52 resting on the receiver pads 93, 95, 96, 98 and 100. A pickup stylus 106 is gently lowered onto the information track disposed on the record by means of a stylus lifter 108 (for example, of the type described in U.S. Pat. No. 4,053,161) mounted in a carriage 110. The pickup stylus 106 is disposed at one end of a stylus arm 112. The other end of the stylus arm 106 is secured to the cartridge 46 by means of a rubber coupler 114. Disposed in the bottom wall of the carriage 110 is an opening 116 through which the stylus 106 is selectively lowered for record engagement. During playback, the carriage 110 is translated on guiderails 113 and 115 disposed parallel to the caddy guideways 80 and 82 from a starting position at the back of the player toward the front of the player in synchronism with the radially inward motion of the pickup stylus 106 and in a direction disposed opposite to the direction of insertion of the caddy into the player. The recovered signals are processed to reconstruct a standard television signal containing picture and sound information for application to a television receiver.

To transfer the record back to the receiver pads 93, 95, 96, 98 and 100, the function lever 22 is shifted back to the LOAD/UNLOAD position, which, in turn, lowers the turntable 102 to a level below the receiver pads. To retrieve the record from the player, an empty jacket 50 is inserted into the player through the input slot 24 along the guideways 80 and 82. As the jacket 50 arrives at the fully inserted position in the player, the front edge thereof engages the deflected latch defeat members 84 and 86 to cause further downward deflection thereof. Such further downward deflection of the latch defeat members 84 and 86, in turn, effect downward displacement of the spine gripper members 88 and 90, whereby the spine 52 is freed from the player. When the jacket 50 is fully inserted into the player, the spine latch fingers 62 and 64 snap back into the pockets 70 and 72 to lock the spine 52 to the jacket. The record/spine assembly is retrieved from the player when the caddy is withdrawn.

As indicated previously, the carriage 110 is translated from the starting position toward the record center during playback. When an empty jacket 50 is inserted into the player for record retrieval, the front edge thereof engages the carriage 110 to push the carriage back to the starting position at the rear of the player in the manner described hereinafter in conjunction with FIGS. 3-7. FIG. 3 provides the plan view and FIGS. 4 and 5 illustrate the side views of the subject carriage reset apparatus 120. FIGS. 6 and 7 show certain details of the carriage reset apparatus 120. The carriage reset apparatus 120 comprises a pushback member 122 secured to the carriage 110 by means of a pivot pin 124 for motion between an operative position, shown in FIG. 4, and an inoperative position, shown in FIG. 5. A spring 126 arranged between a pin 128 disposed on the pushback member 122 and a tab 130 disposed on the carriage 110 biases the pushback member to occupy the operative position as can be seen from FIG. 6. A latch member 132 is pivotally mounted to the carriage 110, adjacent to the pushback member 122, by means of a pin 134 for motion between a depressed position, shown in FIG. 4, and a raised position, shown in FIG. 5. The pushback member 122 is provided with a cutout 136, as can be seen from FIG. 7, in which a projection 138 disposed on the latch member 132 is received when the latch member is disposed in the depressed position to lock the pushback member in the operative position as shown in FIG. 4.

In the operative position, a portion 140 of the pushback member 122 protrudes into the caddy insertion path, so that when the carriage 110 is at a position other than the starting position, the front edge of the caddy 26 engages the protruding portion to effect displacement of the carriage toward the starting position during caddy insertion in the manner shown in FIG. 4. When the carriage 110 arrives at the starting position, an adjustable stop member 142 disposed in the player engages an actuating rod 144, slidably mounted on the carriage and having one end secured to the latch member 132, to dispose the latch member in the raised position, thereby freeing the pushback member 122 for rotation into the inoperative position as the caddy is further inserted into the player in the manner shown in FIG. 5. In the inoperative position, the protruding portion 140 of the pushback member 122 is out of the caddy insertion path.

A light spring 146 arranged between a wall 148 disposed on the carriage 110 and a washer 150 fixedly secured to the actuating rod 144 biases the actuating rod in such manner that the latch member 126 is urged to return to the depressed position thereof. When the caddy 26 is withdrawn from the player, the spring 126 returns the pushback member 122 to the position shown in FIG. 4. When the carriage 110 moves away from the starting position after the caddy 26 is withdrawn, the spring 140 returns the latch member 132 to the position depicted in FIG. 4.

The player is provided with a stylus cleaning apparatus 152 which cleans the stylus 106 as the caddy 26 is withdrawn from the player. The stylus cleaning apparatus is described in detail in a commonly-assigned U.S. patent application Ser. No. 122,959, entitled "STYLUS CLEANING APPARATUS FOR VIDEO DISC PLAYER" and filed in the name of L. M. Hughes. Disposed in the player is a caddy-operated record side identifier 154, which provides an indication of the record side subject to playback on the tally lights 42 disposed on the player instrument panel 38. Reference is made to a commonly-assigned U.S. patent application, Ser. No. 098,411, filed for L. M. Hughes for details of the record side identifier. The player is provided with locating members 156, 158 and 160 to accurately register the retained record/spine assembly in the player.

What is claimed is:

1. In a player having a pickup means for recovering prerecorded information from a record disposed on a turntable; said pickup means being supported in a carriage which is subject to translatory motion along a path from a starting position toward the turntable center during playback; said record being subject to removable occupancy of a protective cover adapted for insertion into said player; carriage reset apparatus comprising:
(A) a first member secured to said carriage and subject to disposition in an operative position and an inoperative position;
(B) means for selectively latching said first member in said operative position when said carriage is disposed at a position other than said starting position; said first member, when latched in said operative position, being subject to engagement with said cover during said cover insertion to effect travel of said carriage toward said starting position; and
(C) means, responsive to the arrival of said carriage at said starting position, for defeating said latching means to permit disposition of said first member in said inoperative position; said first member, when disposed in said inoperative position, being ineffective to cause further carriage travel during further cover insertion.

2. The carriage reset apparatus as defined in claim 1 wherein said first member is mounted on said carriage for motion between said operative position, where a portion of said first member protrudes into the path of said cover during insertion thereof, and said inoperative position, where said portion of said first member is disposed out of said cover insertion path; and wherein said carriage reset apparatus further includes means for biasing said first member toward said operative position.

3. The carriage reset apparatus as defined in claim 2 wherein said latching means comprises a second member disposed on said carriage for motion between a first position and a second position; wherein said carriage reset apparatus is provided with means for urging said second member toward said first position; said second member, when disposed in said first position, being subject to engagement with said first member to lock said first member in said operative position.

4. The carriage reset apparatus as defined in claim 3 wherein said latch defeating means comprises a stop element disposed in said player for causing said second member to move to said second position in response to the arrival of said carriage at said starting position; said second member, when disposed in said second position, freeing said first member from interference by said second member.

5. The carriage reset apparatus as defined in claim 4 wherein the position of said stop element is subject to adjustment to allow variation in the location at which said stop element causes actuation of said second member.

6. The carriage reset apparatus as defined in claim 1 wherein said first member is mounted on said carriage for motion between said operative position, where a portion of said first member protrudes into said cover insertion path, and said inoperative position, where said portion of said first member is disposed out of said cover insertion path; wherein said carriage reset apparatus further includes means for biasing said first member toward said operative position; wherein said latching means comprises a second member disposed on said carriage for motion between a first position and a second position; wherein said carriage reset apparatus is provided with means for urging said second member toward said first position; said second member, when disposed in said first position, being subject to engagement with said first member to lock said first member in said operative position; wherein said latch releasing means comprises a stop element disposed in said player for displacing said second member to said second position in response to the arrival of said carriage at said starting position; said second member, when disposed in said second position, freeing said first member from interference by said second member.

7. The carriage reset apparatus as defined in claim 6 wherein the position of said stop element is subject to adjustment to allow variation in the location at which said stop element actuates said second member.

8. In a player having a pickup stylus for recovering prerecorded information from a record disposed on a turntable; said stylus being supported in a carriage which is subject to translatory motion along a path from a starting position toward the turntable center during playback; said record being subject to removable occupancy of a protective cover; said player having a record extraction mechanism for removing the enclosed record from said cover for retention in said player during cover withdrawal subsequent to the insertion of a full cover into said player along a further path disposed substantially parallel to said carriage path; wherein an empty cover is inserted into said player along said further path for retrieving said record; carriage reset apparatus comprising:
(A) a first member secured to said carriage and subject to disposition in an operative position and an inoperative position;
(B) means for selectively latching said first member in said operative position when said carriage is disposed at a position other than said starting position; said first member, when latched in said operative position, being subject to engagement with said cover during said cover insertion to effect travel of said carriage toward said starting position; and
(C) means, responsive to arrival of said carriage at said starting position during said travel of said carriage, for releasing said latching means to allow disposition of said first member in said inoperative position in response to further insertion of said cover into said player; said first member, when disposed in said inoperative position, allowing further cover insertion without causing further carriage travel.

* * * * *